(12) United States Patent
Nagano

(10) Patent No.: US 6,263,028 B1
(45) Date of Patent: *Jul. 17, 2001

(54) APPARATUS AND METHOD FOR MEASURING MODULATION ACCURACY

(75) Inventor: Masao Nagano, Saitama (JP)

(73) Assignee: Advantest Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/882,347

(22) Filed: Jun. 25, 1997

(30) Foreign Application Priority Data

Jul. 1, 1996 (JP) .................................................. 8-171057

(51) Int. Cl.⁷ .............................. H03D 3/22; H04L 27/22
(52) U.S. Cl. .......................... 375/329; 375/324; 375/332; 329/304
(58) Field of Search ..................................... 375/329, 331, 375/332, 324, 322, 279, 280, 281, 261, 224, 308; 329/304; 455/115, 226.1, 67.1; 332/103, 106

(56) References Cited

U.S. PATENT DOCUMENTS 5,187,719 * 2/1993 Birgenheier et al. ................. 375/226
5,590,158 * 12/1996 Yamaguchi et al. ................. 375/331
5,640,416 * 6/1997 Chalmers ............................. 375/147

OTHER PUBLICATIONS

John G. Proakis, Digital Communications, Second Edition, McGraw–Hill, pp. 164–165, 302–303.
R.W. Hamming, Digital Filters, Prentice–Hall, pp. 48–49.

* cited by examiner

Primary Examiner—Young T. Tse
(74) Attorney, Agent, or Firm—Staas & Halsey LLP

(57) ABSTRACT

A digitized quadrature detected output of a sampling rate R ($=16R_s$, where $R_s$ is the symbol rate) from a quadrature detector is subjected to FFT processing and the frequency of the peak power spectrum of the FFT output is detected. Then, a frequency error $\Omega_{01}$ between the frequency of the peak power spectrum and a standardized value is calculated and the frequency error $\Omega_{01}$ of the detected output is corrected. The corrected output is decimated by a filter to a signal of a sampling rate $4R_s$, which is input into an estimate part, wherein a clock phase is calculated which minimizes variance of the amplitude of the input sample data and a frequency error $\Omega_{02}$ is computed from a deviation of the signal point of the input sample data from a standardized angle value of the signal. The frequency error $\Omega_{02}$ of the output from the filter is corrected, then a clock delay of the corrected output is corrected, and the corrected output is converted by decimation to a signal of a sampling rate $R_s$, from which an ideal signal is derived and used to calculate modulation accuracy parameters in the same manner as in the prior art.

25 Claims, 5 Drawing Sheets

US 6,263,028 B1

APPARATUS AND METHOD FOR MEASURING MODULATION ACCURACY

BACKGROUND OF THE INVENTION

1. Field of the Invention

The present invention relates to an apparatus and method for measuring modulation parameters such as a transmitter gain $A_0$, a droop factor (an amplitude variation per symbol) $\sigma_0$, a frequency error $\Omega_0$, a phase error $\theta_0$ and I/Q origin offset $B_0$ in PSK, DPSK, QAM, GMS and similar quadrature-modulated wave signals modulated by digital data.

2. Description of the Related Art

Conventional apparatuses of this kind are disclosed, for example, in U.S. Pat. Nos. 5,187,719 (issued Feb. 16, 1993) (see the disclosure associated with FIG. 15, in particular) and 5,590,158 (issued Dec. 31, 1996). In these apparatus the input modulated wave signal is converted or transformed into an intermediate frequency signal, which is then converted to a digital signal for measurement of the modulation accuracy of the modulated signal through digital processing. And the intermediate frequency signal converted to digital form is subjected to DFT (Discrete Fourier Transform) processing to determine what is called a clock delay that is a phase difference between a symbol in the modulated wave signal and a symbol clock for measuring the symbol, and the intermediate frequency signal is corrected through digital processing by an interpolation filter in accordance with the clock delay thus determined.

Conventionally, the clock delay is determined through DFT processing of the intermediate frequency signal, so that its sampling rate needs to be sufficiently high, for example, approximately 1 MHz so as to provide the clock delay with required accuracy. Because of such a high sampling rate, much time is spent in digital processing for passing the A/D converted intermediate frequency signal through an intermediate frequency band pass filter and this period of time needed is as long as about one-third the total amount of measuring time of the modulation accuracy measuring apparatus.

SUMMARY OF THE INVENTION

According to the present invention, the intermediate frequency signal converted into digital form is quadrature-converted and the converted output is then down converted by a decimation means to substantially the lowest sampling rate necessary for measurement, which is more than twice the frequency bandwidth of a base band signal that is the quadrature-converted output, about four times in view of design margin. From the output of the decimation means, a clock delay is detected by a clock delay estimate means through utilization of a variance method and the quadrature-converted output is corrected by a delay correct means by the detected clock delay to produce a signal for obtaining demodulated data.

More specifically, the quadrature-converted output is subjected to fast fourier transform processing, then a rough estimate of a frequency error is calculated from the result of transformation, and the quadrature-converted output is corrected corresponding to the thus calculated frequency error and fed to the decimation means.

The frequency error of the input quadrature-converted output is further detected by the clock delay estimate means, then the detected frequency error is corrected by a second frequency correct means with respect to the output of the decimation means, and the thus corrected output is fed to the delay correct means.

The signal corrected by the second frequency correct means is repeatedly fed back to the clock delay estimate means until the frequency error detected by the clock delay estimate means goes down below a predetermined value.

The clock delay estimate means also detects origin offset of the quadrature-converted output in the I/Q plane and corrects its origin offset accordingly, the thus corrected quadrature-converted output is fed to the delay correct means.

The delay correct means includes also a decimation means that outputs only data at symbol points.

An error vector is computed from the output signal of the delay correct means and an ideal signal. The error vector is repeatedly calculated with the corrected delay by the delay correct means slightly varied so that the error vector is minimized.

DESCRIPTION OF THE PREFERRED EMBODIMENT

Figure 1:
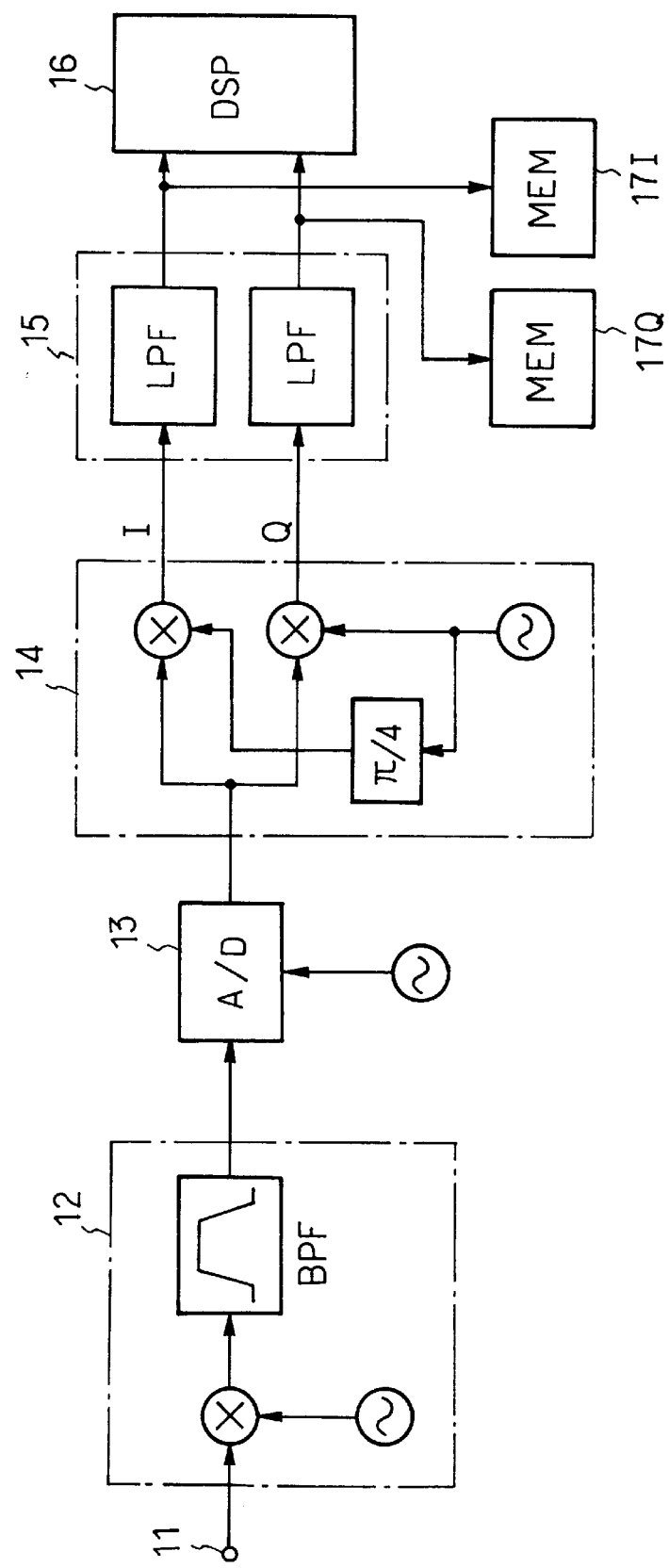
FIG. 1 is a block diagram illustrating a general configuration of a modulation accuracy measuring apparatus.

An embodiment of the present invention will be described with reference to the drawings. In FIG. 1 there is illustrated in block form a general configuration for digital processing of a high frequency digital modulated signal. A high frequency modulated signal, for example, DQPSK modulated by digital data, from an input terminal 11 is converted by a down converter 12 into an intermediate-frequency signal, which is sampled by an analog-to-digital (AD) converter 13 at a sampling frequency four times higher than the intermediate frequency to produce a digital IF signal. Thereafter the digital signal is subjected to digital processing. In the first place, the digital signal is fed to a quadrature converter, for example, a quadrature detector 14, wherein it is multiplied by sine and cosine signals of a frequency identical with or close to the intermediate frequency. The multiplied outputs are passed through low-pass filters 15 to extract base band signals of in-phase and quadrature component signals I and Q, which are input into a digital signal processor 16 and, at the same time, stored in memories $17_I$ and $17_Q$, respectively.

Figure 2:
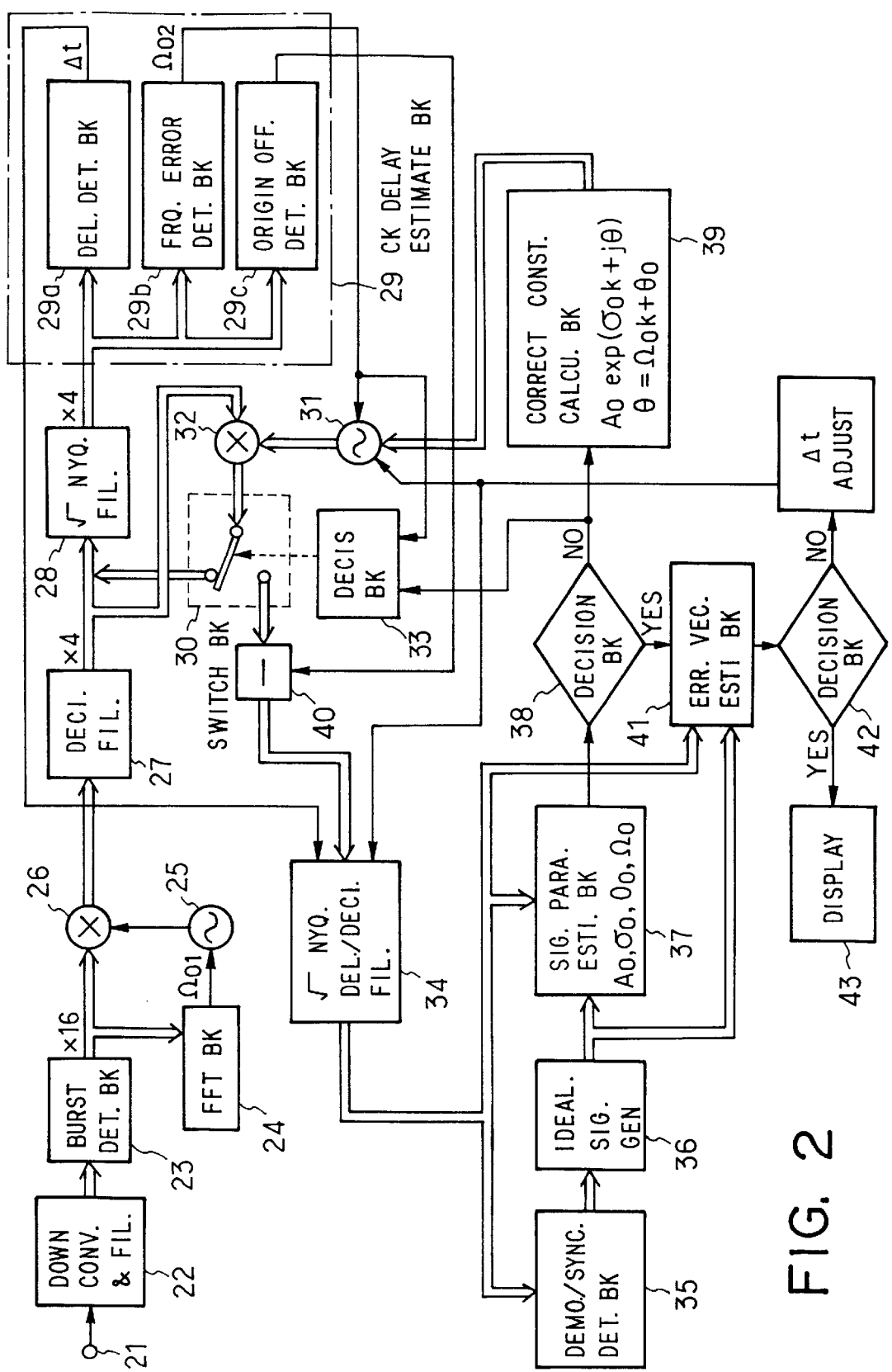
FIG. 2 is a functional block diagram illustrating an embodiment of the present invention.

The digital signal processor 16 performs processing such as demodulation and modulation analysis. In FIG. 2 there is illustrated the functional configuration therefor at the output side of the AD converter 13. The output of the AD converter 13 in FIG. 1 is input via an input terminal 21 into a frequency converter/decimation filter 22, wherein it is converted to a base band signal and, at the same time, down converted to a proper sampling rate. This part corresponds to those of the quadarature detector 14 and the low-pass filter 15 in FIG. 1; hardware dedicated to this part is commercially available. The output of the converter/filter 22 is once stored in a memory though not shown. The sampling rate of this output is set at 16 times higher than the symbol rate in this example. The decimation filter is disclosed, for example, in OCHI Hiroshi, "An Introduction to Digital filter Design," pp.210–212, CQ Publishing Co. Ltd., Jan. 20, 1991. From the base band signal, a burst portion is extracted by a burst detection block 23, and the burst signal is subjected to complex Fourier transform processing by a fourier transform block 24 to detect a frequency error. That is, the input I and Q signals are subjected to complex fast Fourier transform (FFT) processing to detect the frequency at the center point of a power distribution or profile in the frequency domain, that is, the carrier frequency. In this case, the total power $P_t$ of the power spectrum, for example, is calculated and a mid-point frequency between a frequency $f_1$ at which the total power in the low frequency range is above $P_t \times 0.005$ and a frequency $f_2$ at which the total power in the high frequency range is above $P_t \times 0.005$ is set as the carrier frequency. A deviation of this carrier frequency from a standardized value, that is, a frequency error $(\Omega_{01}/2\pi)$ is calculated. A correcting signal $\exp(j\Omega_{01}t)$ which uses the frequency error as its frequency is generated by a signal generator 25, and the output I and Q signals of the filter block 22 are respectively multiplied by the correcting signal by a multiplier 26 to correct the frequency error. The value of the frequency error computed by FFT is given as $(\Omega_{01}/2\pi)=\Delta F - f_s \times k/(2N)$, where $f_s$ is a sampling frequency of 336 kHz, for instance, and N is a FFT size of 1024, for instance. In the multiplication $\exp(j\Omega_{01}t)$ by the multiplier 26, time t is quantized and hence $t[i]=k/f_s$, so that $\exp(j\Omega_{01}t)=\exp(jk2\pi/2N)$ and this matches a trigonometric function table that is used in FFT. Hence, the signal generator 25 does not require sine and cosine operations and only needs to utilize the sine and cosine values used in the FFT operation.

The I and Q signals thus corrected for frequency errors are limited by a decimation filter 27 to the minimum band necessary for measurement and, for fast execution of operations, they are decimated. The modulated wave needs to be band-limited by a Nyquist filter 28 and the bandwidth of the decimation filter 27 must be chosen such that the modulated wave is band-limited with accuracy. In $\pi/4$ DQPSK modulation, since the bandwidth of the Nyquist filter 28 is twice the symbol frequency, it is necessary that the bandwidth of the decimation filter 27 be at least four times the symbol frequency. In other words, the sampling rate needs to be more than four times higher than the symbol rate. The output of the decimation filter 27 is passed through the Nyquist filter 28 so that symbol points converge, and the filter output is fed to a clock delay estimate block 29.

Figure 3A:
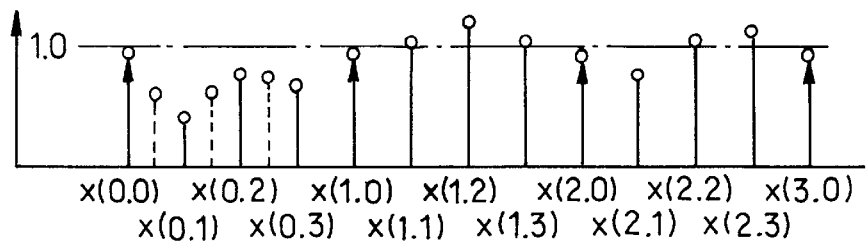
FIG. 3A is a plot showing the amplitude in a data sequence that is input into a clock delay estimate section.
Figure 3B:
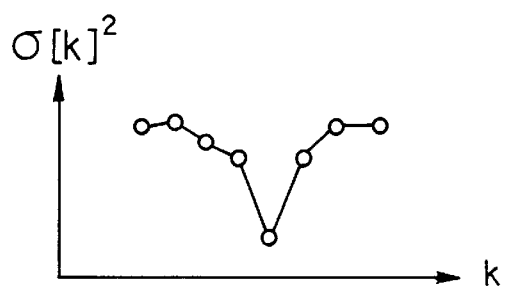
FIG. 3B is a graph showing an example of covariance value fluctuations with a value k.

In a delay detection block 29a of the clock delay estimate block 29, the variance of the signal amplitude for each symbol period is detected with the symbol timing slightly shifted and the timing at which the variance is minimum is set as a clock delay. That is, for example, as shown in FIG. 3A, each value $x(i,k)$ in a sequence of the amplitude $(I^2+Q^2)$ of a combined signal of the I and Q signals is given a number i for each symbol period and a number k in each symbol period and the variance $\sigma(k)^2$ is computed by the following equation:

$$\sigma(k)^2 = \Sigma(x(i,k) - \text{avg } x)^2 \quad \text{avg } x = (\Sigma x(i,k))/N$$

where $\Sigma$ is the summation from i=0 to N−1 and N is a standardized value, which is a little smaller than the value corresponding to the number of symbols contained in one burst (four times larger than the number of symbols in this example). When k matches the symbol timing, the variance $\sigma(k)^2$ decreases sharply as shown in FIG. 3B. This value k (clock phase) is the clock delay. The clock delay could be obtained at resolution higher than that corresponding to the sampling rate by the interpolation between the amplitudes $x(i,k)$ with a curve of a proper order (third order or so, for instance). For example, by repeating the interpolation three times based on a third order interpolation formula, an eight-fold interpolation is performed, and since the original signal prior to the correction is four times higher than the symbol rate, the clock delay can be provided at resolution corresponding to a value 32 times higher than the symbol rate.

Figure 3C:
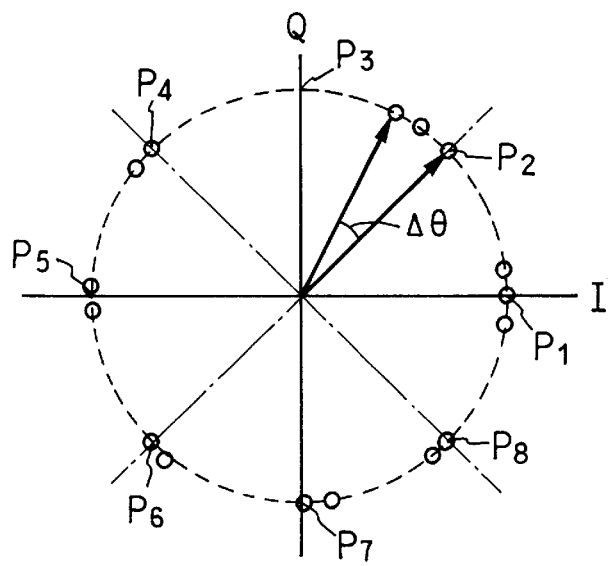
FIG. 3C is a diagram showing an example of variations in symbol points of demodulated data.
Figure 3D:
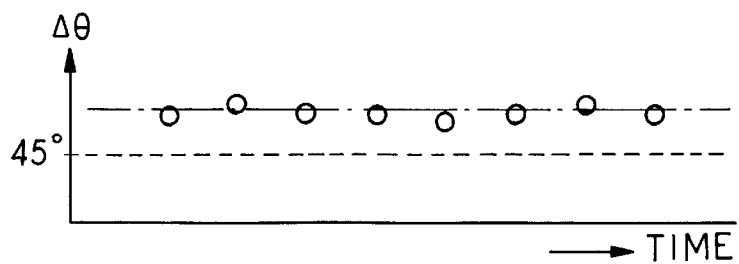
FIG. 3D is a plot illustrating an example of the deviation angle in one signal point group with respect to a reference.

In the clock delay estimate block 29, a rough estimate of the I/Q origin offset as well as a frequency error $\Omega_{01}$ are calculated. In the case of $\pi/4$ DQPSK modulation, the phase difference between symbols is an integral multiple of 45 degrees. For example, as shown in FIG. 3C, it is any one of signal points $P_1$ to $P_8$ sequentially shifted in the I/Q plane in steps of $\pi/4$. A deviation $\Delta\theta$ from the integral multiple of the 45° inter-symbol phase difference is based on the frequency error. The phase difference, $(\tan^{-1}(I_{i+1}/Q_{i+1}) - \tan^{-1}(I_i/Q_i))$, is divided by $\pi/4$, in which case the remainder $\Delta\theta_i$ varies as depicted in FIG. 3D, and in a frequency error detection block 29b, the frequency error $\Omega_{02}$ is calculated by the following equation:

$$\Omega_{02} = \Sigma\Delta\theta_i/(N \times 2\pi\Delta t)$$

where $\Sigma$ represents the summation from i=0 to N, N is identical with the value N used to compute the variance $\sigma(k)^2$ and $\Delta t$ is the symbol period.

Figure 4A:
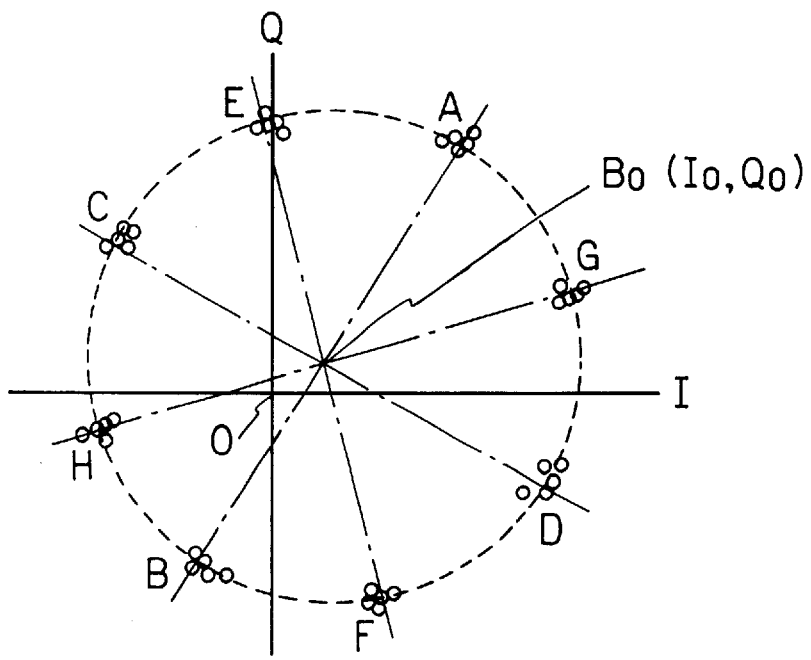
FIG. 4A is a diagram showing an example of a symbol point distribution in demodulated data.
Figure 4B:
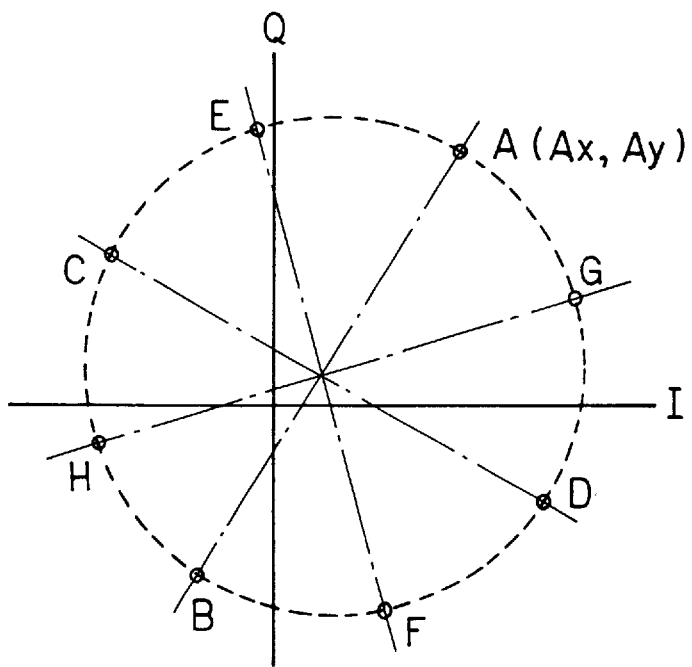
FIG. 4B is a diagram showing the center of gravity of each symbol point group in FIG. 4A.

Even if the origin of the demodulated signal point is at a point $B(I_0, Q_0)$ displaced from the I/Q origin O as shown in FIG. 4A, the midpoint between demodulated signal point groups A and B displaced $\pi$ apart in phase is substantially at a point $(I_0, Q_0)$, the midpoint between demodulated signal point groups C and D similarly displaced $\pi$ apart in phase is also substantially at the point $(I_0, Q_0)$, and the midpoints between demodulated signal point groups E and F similarly phased $\pi$ apart and between those G and H are also substantially at the point $(I_0, Q_0)$. Thus, the centroids $(A_x, A_y)$ to $(H_x, H_y)$ at the respective signal points A to H are computed and they can be used to calculate the origin offset $(I_0, Q_0)$. That is, in an origin offset detection block 29c, letting the position of each point be represented by $(A_{xi}, A_{yi})$ and setting i=0 to Na, the centroid of the signal point group A can be given as follows:

$$A_x = \Sigma A_{xi}/Na, \quad A_y = \Sigma A_{yi}/Na$$

where $\Sigma$ represents the summation from i=0 to Na. Na in the burst represents the number of signals in the signal point group A.

Likewise, the centroids of the other signal point groups B through H are computed. Next, the midpoint $M_{ab}(M_{abx}, M_{aby})$ between the centroids $(A_x, A_y)$ and $(B_x, B_y)$ are calculated by the following equations:

$$M_{abx} = (A_x + B_x)/2, \quad M_{aby} = (A_y + B_y)/2$$

Thereafter, midpoints $(M_{cdx}, M_{cdy})$, $(M_{efx}, M_{efy})$ and $(M_{ghx}, M_{ghy})$ between centroids $(C_x, C_y)$ and $(D_x, D_y)$, between $(E_x, E_y)$ and $(F_x, F_y)$ and between $(G_x, G_y)$ and $(H_x, H_y)$ are similarly calculated, and the centroid $M(M_x, M_y)$ of the midpoint group is computed by the following equations:

$$M_x = (M_{abx} + M_{cdx} + M_{efx} + M_{ghx})/4$$

$$M_y = (M_{aby} + M_{cdy} + M_{efy} + M_{ghy})/4$$

The origin offset $(I_0, Q_0)$ equals $(M_x, M_y)$.

A correcting signal $\exp(j\Omega_{02}t)$ for correcting the frequency error $\Omega_{02}$ detected in the clock delay estimate block 29 is generated by a signal generator 31. The I and Q signals from the decimation filter 27 are multiplied by the correcting signal in a multiplier 32, thereby correcting the frequency error.

In a decision block 33 a check is made to see if the frequency error $\Omega_{02}$ used for the frequency error correction is in excess of a predetermined value, and a switching block 30 is controlled accordingly. When the frequency error is greater than the predetermined value, the output of the multiplier 32 is input into the root Nyquist filter 28, then its output is estimated again in the clock delay estimate block 29, and the same frequency correction as mentioned above is carried out. This processing is repeated until the frequency error $\Omega_{02}$ goes down below the predetermined value.

When the frequency error $\Omega_{02}$ becomes smaller than the predetermined value, the origin offset $I_0/Q_0$ is subtracted from the output of the multiplier 32 in an origin offset correcting block 40 and input into a root Nyquist delay/decimation filter 34, which corrects the clock delay and, at the same time, decimates data other than the symbol point data. To make this correction of the clock delay, the coefficient of the filter 34 is set corresponding to the clock delay k ($\Delta t$) computed in the clock delay estimate block 29. That is, the root Nyquist filter has such a frequency characteristic Y(f) as follows:

$$Y(f) = 1 \text{ for } |f| \leq \frac{1-\alpha}{2T}$$

$$Y(f) = \cos\left(\frac{\pi |f| T}{2\alpha} - \frac{\pi(1-\alpha)}{4\alpha}\right) \text{ for } \frac{1-\alpha}{2T} \leq |f| \leq \frac{1+\alpha}{2T}$$

$$Y(f) = 0 \text{ for } \frac{1+\alpha}{2T} \leq |f|$$

where $\alpha$ is a roll-off coefficient.

An impulse response y(t) can be computed from an inverse fourier transform of Y(f) as given by the following equation:

$$y(t) = \frac{1}{\pi\left(1-\left(\frac{4\alpha t}{T}\right)^2\right)}\left\{\frac{4\alpha}{T}\cos\left(\frac{\pi}{T}(1+\alpha)t\right) + \frac{1}{t}\sin\left(\frac{\pi}{T}(1-\alpha)t\right)\right\}$$

When the root Nyquist filter is formed by a FIR filter, y(t) is the filter coefficient. For the correction of the clock delay $\Delta t$, the filter coefficient needs only to be determined setting $y(t+\Delta t)$. The decimation is also made at the same time. In this way, a signal of only sample data synchronized with symbols can be produced. This signal is fed to a demodulating/synchronization detection block 35, wherein it is demodulated and, at the same time, a synchronization symbol (when a synchronization symbol of a particular pattern is contained as in an input signal to some kinds of pocket telephones) is searched, and the demodulated signal is synchronized with the detected symbol and fed to an ideal signal generator 36.

The thus demodulated data is estimated to be ideal data and a modulated signal (an ideal signal) is generated by the ideal signal generator 36. The ideal signal and the received I and Q signals from the filter 34 are input into a signal parameter estimate block 37, wherein the modulation accuracy parameters $A_0$, $\sigma_0$, $\theta_0$ and $\Omega_0$ are computed. The computation can be conducted by conventional techniques. This computation is made for each symbol period and the computational complexity is remarkably smaller than in the past. It is checked in a decision block 38 whether the results of computation are proper; if not, then $r=\Omega_0 k+\theta_0$ and $\sigma_0 k+j\theta$ (where k is a quantization instant of time) are calculated in a correcting constant calculating block 39 and $A_0\exp(\sigma_0 k+j\theta)$ is generated by the signal generator 31. The I and Q signals from the filter 27 are corrected accordingly. That is to say, the output signal of the filter 27 is processed for frequency correction, initial phase setting and amplitude normalization.

The received I and Q signals from the filter 34 and the ideal signal are also fed to an error vector estimate block 41, wherein a modulation accuracy parameter (an error vector $\epsilon$) is selected from an ultimately optimized parameter group in the same manner as in the past. A decision block 42 controls the phase of the signal from the signal generator 31 to change the clock delay by $\Delta t$ so that the error vector $\epsilon$ is minimized. The decision block 42 also controls the filter 34 to perform again the same processing of the output signal from the multiplier 32 as described above. When the error vector $\epsilon$ is decided to have become small, the measurement result is displayed on a display 43. The clock delay $\Delta t$ is adjusted to be, for example, ½ through ⅛ of resolution (accuracy) at which the clock delay was computed in the clock delay estimate block 29, and the adjustment is repeated a proper number of times $\Delta t$. At this time, $\Delta t$ may be decreased from ½ to ¼ and then ⅛.

Figure 5:
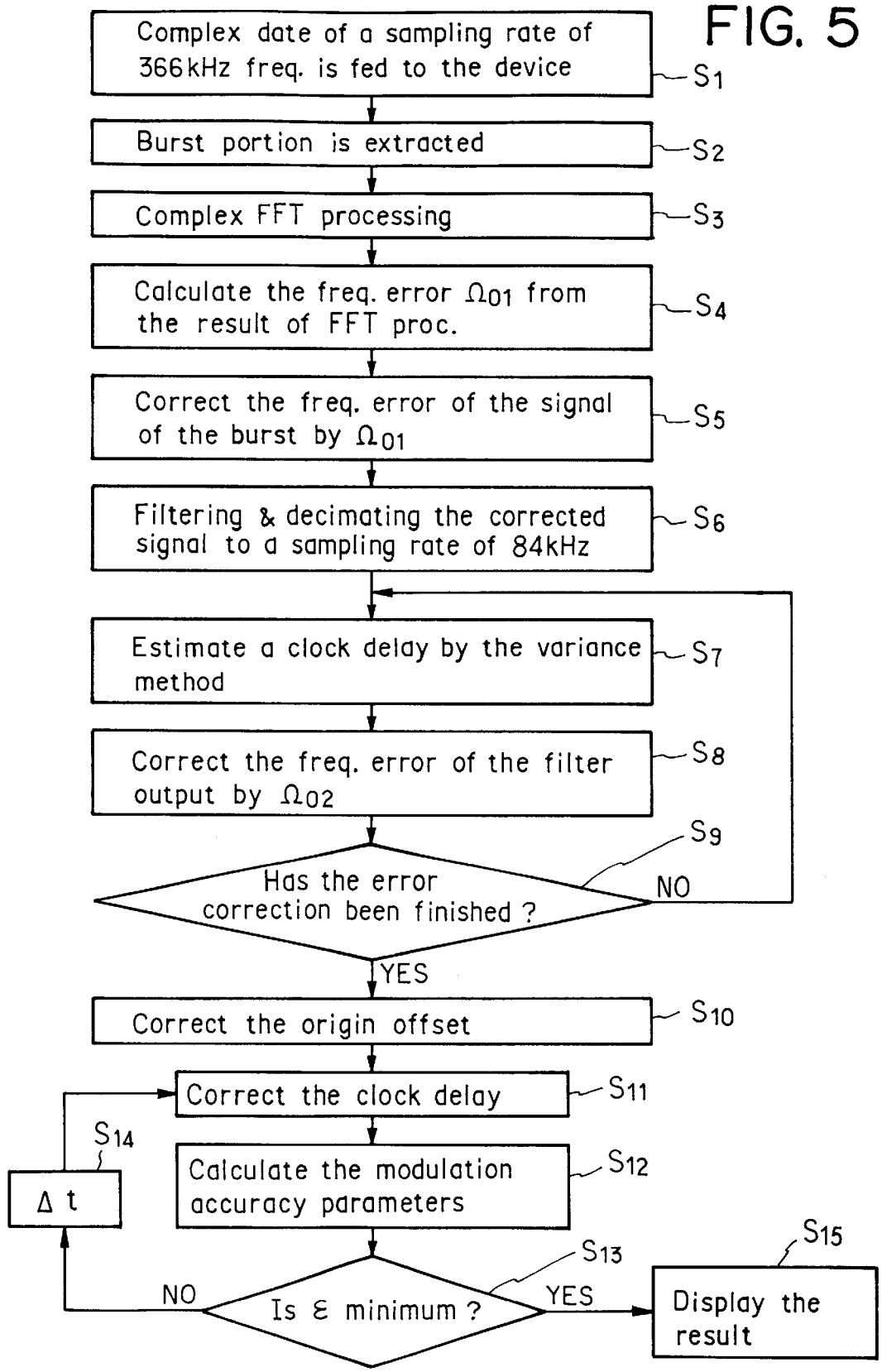
FIG. 5 is a flowchart illustrating the procedure of the embodiment according to the present invention.

In FIG. 5 there is illustrated the procedure described above. For example, complex data sampled at a 366 kHz sampling frequency is fed to the measuring device ($S_1$), then a burst portion is extracted from the data ($S_2$), and the extracted burst portion is subjected to complex FFT processing ($S_3$). Then, a rough estimate of the frequency error $\Omega_{01}$ is calculated from the result of complex FFT processing ($S_4$), the frequency error $\Omega_{01}$ is used to perform a frequency error correction of the signal of the burst portion ($S_5$), then the corrected signal is band limited and, at the same time, decimated by the Nyquist decimation filter to a sampling rate of 84 kHz ($S_6$). For the output signal of the Nyquist filter, a clock delay is computed by the variance method and, at the same time, the frequency error $\Omega_{02}$ and the origin offset $B_0$ are also calculated ($S_7$). A frequency error correction is carried out for the Nyquist decimation filter output (hereinafter called intermediate data) provided in step $S_6$ ($S_8$), and a check is made to see if the frequency error $\Omega_{02}$ has become smaller than a predetermined value ($S_9$). If not, then the procedure goes back to step $S_7$. If the frequency error is smaller than the predetermined value, then the origin offset is subtracted from the frequency-corrected intermediate data ($S_{10}$), and the clock delay is corrected by the filter 34 and, at the same time, decimated to the symbol period ($S_{11}$), after which the modulation accuracy parameters are calculated ($S_{12}$). As a result, a check is made to see if the error vector $\epsilon$ has been minimized ($S_{13}$); if not, the clock delay $\Delta t$ for adjustment is set and the procedure returns to step $S_{10}$ ($S_{14}$). If the error vector $\epsilon$ is found to be minimum, the modulation accuracy parameters computed at that time are displayed ($S_{15}$).

The present invention is applicable to the measurement of modulation accuracy parameters of PSK, QAM, GMS and other quadrature modulated waves as well as the π/4 DQPSK modulated wave.

As described above, the input modulated wave is decimated by the decimation filter 27 to a signal of the required but lowest sampling rate according to the type of modulation or kind of the signal; in the embodiment described above, it is converted to a signal of a sampling rate four times higher than the symbol rate. The clock delay is calculated by the amplitude variance method from such a signal. Since this signal is low in sampling rate and is not a complex signal, the calculation needed is a real-number calculation $I^2+Q^2$ whose computational complexity is small, and the clock delay can be provided by the afore-mentioned interpolation method with an appreciably high degree of accuracy. The computational complexity even by such an interpolation is significantly smaller than that involved in the prior art which performs digital processing of a complex intermediate frequency signal.

When the frequency error is large, the signal is seriously distorted in the filter 28, but by calculating a rough estimate of the frequency error $\Omega_{01}$ in the FFT processing block 24 and then correcting the error, the clock delay can be estimated accurately in the clock estimate block 29. In this instance, the correction of the frequency error $\Omega_{01}$ can utilize the values $\cos\Omega_{01}t$ and $\sin\Omega_{01}t$ used in the FFT processing, and hence its computational complexity is small, and the FFT processing can be achieved instantaneously using a commercially available chip.

Further, the modulation accuracy parameter estimate block 37 and the error vector estimate block 41 only need to perform calculations with the symbol rate period and the computational complexity involved is also small, for example, ⅕ that in the past. Hence, the computing time is reduced as a whole.

Additionally, the parameters can be provided with a higher degree of accuracy than in the past because the clock delay is repeatedly adjusted a number of times $\Delta t$ to reduce the error vector.

Incidentally, the origin offset is also computed by a method significantly simpler than that used in the past.

It will be apparent that many modifications and variations may be effected without departing from the scope of the novel concepts of the present invention.

What is claimed is:

1. A modulation accuracy measuring apparatus converting an input modulated signal quadrature modulated by digital data into a digital signal, quadrature converting said digital signal into a quadrature converted output, demodulating said quadrature converted output to obtain demodulated data, generating an ideal modulated signal from said demodulated data, and computing modulation accuracy parameters of said input modulated signal from said ideal modulated signal and said digital signal of said input modulated signal, said apparatus comprising:

decimation means for decimating said quadrature converted output to a decimated output having a lowest sampling rate which is four times higher than a symbol rate;

clock delay estimate means comprising means for detecting a clock delay $\Delta t$ from the decimated output of said decimation means; and delay correcting means for correcting said decimated output of said decimation means with said detected clock delay $\Delta t$ to thereby obtain a signal for providing said demodulated data.

2. The apparatus according to claim 1, further comprising:

first frequency error detecting means for computing a first rough estimated frequency error $\Omega_{01}$ by applying fast Fourier transform processing to said quadrature converted output; and first frequency error correcting means for correcting said quadrature converted output with the thus computed first frequency error $\Omega_{01}$ to thereby obtain a first frequency error corrected quadrature converted output which is applicable to said decimation means.

3. The apparatus according to claim 2, wherein said clock delay estimate means further comprises second frequency error detecting means for detecting a second frequency error $\Omega_{02}$ from the decimated output of said decimation means; and said apparatus further comprising second frequency error correcting means for correcting the decimated output of said decimation means with the thus detected second frequency error $\Omega_{02}$ to thereby obtain a second frequency error corrected output which is applicable to said delay correcting means.

4. The apparatus according to claim 3, further comprising means for causing said second frequency error detecting means to repeat its detecting operation and said second frequency error correcting means to repeat its correcting operation until the second frequency error $\Omega_{02}$ thus detected by the second frequency error detecting means goes down below a predetermined value.

5. The apparatus according to claim 3, wherein said clock delay estimate means further comprises means for detecting origin offset of said quadrature converted output on an I/Q plane from the decimated output of said decimation means; and said apparatus further comprising I/Q origin correcting means for correcting the decimated output of said decimation means with the thus detected origin offset and for supplying said corrected output of said decimation means to said delay correcting means.

6. The apparatus according to claim 2, wherein said clock delay estimate means further comprises means for detecting origin offset of said quadrature converted output on an I/Q plane; and said apparatus further comprising I/Q origin correcting means for correcting the decimated output of said decimation means with said detected origin offset and for supplying a, corrected output of said decimation means to said delay correcting means.

7. The apparatus according to claim 1, wherein said delay correcting means further functions decimation to thereby obtain an output signal which includes sampled data synchronized to symbol points alone as the signal for providing said demodulated data.

8. The apparatus according to claim 1, further comprising:

means for detecting an error vector from the output signal of said delay correcting means and said ideal modulated signal; and means for repeating the detection of said error vector while slightly changing the clock delay for said delay correcting means to obtain said clock delay that minimizes said error vector and for outputting said modulation accuracy parameters at that time.

9. The apparatus according to claim 1, wherein said means for detecting the clock delay $\Delta t$ detects respective variances of signal amplitude of the output signal of said decimation means for each symbol period at respective slightly shifted timings, determining such a timing at which the variance becomes minimum to be the clock delay $\Delta t$.

10. A modulation accuracy measuring method which converts an input modulated signal, which is quadrature modulated by digital data, into a digital signal, quadrature converts said digital signal to obtain a quadrature converted output, demodulates said quadrature converted output to obtain demodulated data, generates an ideal modulated signal from said demodulated data, and computes modulation accuracy parameters of said modulated signal from said ideal modulated signal and said digital signal of said input modulated signal, said method comprising:

a step of detecting a first frequency error $\Omega_{01}$ by applying complex fast Fourier transform processing to said quadrature converted output and calculating said first frequency error $\Omega_{01}$ from the result of said processing;

a first frequency error correcting step of correcting said quadrature converted output by using said frequency error $\Omega_{01}$ to obtain a first frequency error corrected quadrature converted output;

a first decimation step of band limiting and decimating said first frequency error corrected quadrature converted output by using a Nyquist decimation filter to lower its sampling rate;

a clock delay estimating step of computing a clock delay, a second frequency error $\Omega_{02}$ and origin offset of said first frequency error corrected quadrature converted output of said lowered sampling rate;

a second frequency error correcting step of correcting said first frequency error corrected quadrature converted output of said lowered sampling rate by using said second frequency error $\Omega_{02}$ to obtain a second frequency error corrected quadrature converted output;

an origin offset correcting step of correcting said second frequency error corrected quadrature converted output by using said origin offset to obtain origin offset corrected quadrature converted output; and a second decimation step of correcting said origin offset corrected quadrature converted output by using said clock delay and extracting therefrom only data of symbol points which are used as signals for providing said demodulated data and for obtaining said modulation accuracy parameters.

11. The method according to claim 10, wherein said clock delay estimating step includes:

a step of computing variance of a difference between an amplitude value of said first frequency error corrected quadrature converted output of said lowered sampling rate supplied from said first decimation step for each symbol period and an average amplitude value; and a step of obtaining said clock delay by using, as symbol timing, a point where said variance is minimum.

12. The method of claim 11, wherein said variance is obtained by computing an amplitude value between sampling points by using interpolation.

13. The method according to claim 10, wherein said clock delay estimating step includes a step of calculating said second frequency error $\Omega_{02}$ from a deviation of the signal point of each sample data of said first frequency error corrected quadrature converted output of said lowered sampling rate supplied from said first decimation step from a standardized angle value.

14. The method of claim 10, wherein said clock delay estimating step includes:

a step of calculating centroids of respective demodulated signal point groups in an I/O plane, calculating midpoints between respective pairs of said demodulated signal point groups which have their centroids displaced about π apart, and determining a centroid of said midpoints as said origin offset.

15. The method of claim 10, further comprising a decision step of making a check to see if said second frequency error $\Omega_{02}$ is smaller than a predetermined value and, if not, returning from said second frequency error correcting step to said clock delay estimating step to said clock delay estimating step and then to said origin offset correcting step.

16. The method of claim 10, further comprising:

an error vector generating step of calculating an error vector between a processed output of said second decimation step and said ideal modulated signal;

a delay adjusting step of slightly changing the clock delay to be corrected in said second decimation step before the procedure goes to said error vector generating step; and a decision step of controlling said error vector generating step and said delay adjusting step in such a manner as to minimize said error vector and outputting, as a signal from which to obtain said modulation accuracy parameters, the processed output of said second decimation step at an instant of time when said error vector is minimum.

17. An apparatus for measuring modulation accuracy of a transmitted signal which is modulated in accordance with input digital modulating data having symbols having a symbol rate comprising:

means for converting an input transmitted signal into a digital signal;

means for performing quadrature conversion on said digital signal to obtain a quadrature converted representation thereof and for further processing the quadrature converted representation to obtain an output signal which includes sampled data synchronized with the symbols;

demodulating means for performing demodulation on the output signal of said means for performing to obtain demodulated data;

means for generating an ideal transmitted signal in accordance with said demodulated data; and means for computing modulation accuracy parameters of said input transmitted signal from both said ideal transmitted signal and said quadrature converted representation of said input transmitted signal;

wherein said means for performing quadrature conversion and for further processing comprises:

decimation means for converting said quadrature converted representation to a decimated signal which is decimated at a lowest sampling rate which is four times higher than said symbol rate;

clock delay estimate means comprising means for detecting a clock delay Δt from the decimated signal of said decimation means; and delay correcting means for correcting said decimated signal of said decimation means with the thus detected clock delay Δt thereby to obtain the output signal which is applicable to said demodulating means.

18. The apparatus according to claim 17, wherein said means for performing quadrature conversion and for further processing further comprises:

means for computing a first frequency error $\Omega_{01}$ through application of fast Fourier transform processing on said quadrature converted representation; and means for correcting said quadrature converted output with said first frequency error $\Omega_{01}$ to obtain a first frequency error corrected quadrature converted output which is applicable to said decimation means.

19. The apparatus according to claim 17, wherein said means for performing quadrature conversion and for further processing further comprises:

a burst detection block detecting a burst signal portion from said quadrature converted representation;

means for detecting a first frequency error through application of fast Fourier transform processing on said quadrature converted representation;

means for generating a correcting signal representing the thus detected first frequency error; and first error correcting means for correcting said quadrature converted representation with the thus generated correcting signal to thereby obtain a first frequency error corrected signal which is applicable to said decimation means.

20. A modulation accuracy measuring method comprising the steps of:

converting an input modulated signal, which is quadrature modulated by digital modulating data, into a digital signal;

quadrature converting said digital signal into a quadrature converted output;

detecting error parameters from the quadrature converted output and correcting the quadrature converted output with the thus detected error parameters;

demodulating an output from said detecting and correcting step to thereby obtain a demodulated representation of the modulating data;

generating an ideal modulated signal from said demodulated representation; and computing modulation accuracy parameters of said input modulated signal from said ideal modulated signal and said demodulated representation;

wherein said detecting and correcting step comprises the steps of:

performing complex fast Fourier transform processing on said quadrature converted output and calculating a first frequency error $\Omega_{01}$ from the result of said processing;

correcting said quadrature converted output by using said first frequency error $\Omega_{01}$ to obtain first frequency error corrected quadrature converted output;

limiting a bandwidth and decimating said first frequency error corrected quadrature converted output by a Nyquist decimation filter to lower its sampling rate;

computing the parameters of the input modulated signal including a clock delay $\Delta t$, a second frequency error $\Omega_{02}$ and origin offset $B_0$ from said first frequency error corrected quadrature converted output;

correcting said first frequency error corrected quadrature converted output by using said second frequency error $\Omega_{02}$ to obtain second frequency error corrected quadrature converted output;

correcting the second frequency error corrected quadrature converted output by using said origin offset to obtain origin offset corrected quadrature converted output; and further decimating the origin offset corrected quadrature converted output to extract therefrom only data of symbol points whereby obtaining the output which is to be subjected to the demodulating step.

21. A modulation accuracy measuring apparatus comprising:

means for receiving an input modulated signal having a symbol rate and for converting the input modulated signal to a quadrature converted output;

decimation means for filtering the quadrature converted output to obtain a filtered output having a limited frequency bandwidth and for decimating said filtered output to obtain a decimated signal having a lowest sampling rate which is four times higher than the symbol rate, and is a minimum sampling rate necessary for measurement;

a clock delay estimate block detecting a clock delay $\Delta t$ based on the decimated signal; and clock delay correcting means for correcting said decimated signal with said detected clock delay.

22. The apparatus according to claim 21, wherein said clock delay estimate block computes respective variances in difference between an amplitude value of said decimated signal for each symbol period and an average amplitude value thereof by slightly shifting of timing, and determines a minimum in the variances as a symbol timing at which timing a clock phase thereof is obtained as said clock delay.

23. A method for measuring modulation accuracy of a transmitted signal that is modulated in accordance with a digital data signal having a symbol rate, said method comprising the steps of:

converting the input transmitted signal to a quadrature converted output;

decimating said quadrature converted output to obtain a decimated signal having a lowest sampling rate which is four times higher than the symbol rate, and is a minimum sampling rate necessary for measurement;

detecting a clock delay $\Delta t$ based on the decimated signal; and correcting said quadrature converted output with said detected clock delay.

24. The method according to claim 23, wherein said step of detecting the clock delay $\Delta t$ comprises the steps of:

computing respective variances in difference between an amplitude value of said decimated signal for each symbol period and an average amplitude value thereof by slightly shifting of timing; and determining a minimum in the variances as a symbol timing at which timing a clock phase thereof is obtained as said clock delay.

25. An apparatus for measuring modulation accuracy of a transmitted signal which is modulated in accordance with input digital modulating data comprising:

means for converting the transmitted signal into a digital signal at a predetermined sampling rate;

means for performing quadrature conversion on said digital signal to obtain a quadrature converted representation thereof;

decimation means for decimating said quadrature converted representation of the transmitted signal to obtain a decimated representation of the transmitted signal which has a lowest sampling rate lower than said predetermined sampling rate;

means for estimating a clock delay $\Delta t$ from the decimated representation of the transmitted signal obtained from said decimation means;

means for correcting said decimated representation obtained from said decimation means with said clock delay $\Delta t$ thus detected and for concurrently performing decimation to obtain an output signal which contains only sampled data synchronized to symbols;

means for performing demodulation on said output signal of the correcting and decimating means to obtain demodulated digital modulating data;

means for generating an ideal transmitted signal by using said demodulated digital modulating data; and means for computing modulation accuracy parameters of said transmitted signal from both said ideal transmitted signal and said output signal of said correcting and decimating means.

* * * * *

UNITED STATES PATENT AND TRADEMARK OFFICE
CERTIFICATE OF CORRECTION

PATENT NO. : 6,263,028 B1
DATED : July 17, 2001
INVENTOR(S) : Masao Nagano

It is certified that error appears in the above-identified patent and that said Letters Patent is hereby corrected as shown below:

Title page,
Item [75], change "Saitama" to -- Kitaadachi --.

Column 8,
Line 38, delete "," after "a".
Line 67, change "from" to -- and --.

Column 9,
Line 56, change "I/O" to -- I/Q --.

Signed and Sealed this

Eleventh Day of December, 2001

Attest:

NICHOLAS P. GODICI
Attesting Officer
Acting Director of the United States Patent and Trademark Office